United States Patent
Brunner et al.

(10) Patent No.: US 10,007,872 B2
(45) Date of Patent: Jun. 26, 2018

(54) MEDIA PROCESSING SYSTEM WITH SCHEDULER

(71) Applicant: Océ Holding B.V., Venlo (NL)

(72) Inventors: Marvin P. Brunner, Venlo (NL); Derya Özçelik-Buskermolen, Venlo (NL); Jurgen Westerhoff, Venlo (NL); Josephus A. M. Van Dun, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days. days.

(21) Appl. No.: 15/429,307

(22) Filed: Feb. 10, 2017

(65) Prior Publication Data
US 2017/0236042 A1    Aug. 17, 2017

(30) Foreign Application Priority Data
Feb. 11, 2016  (EP) .................................... 16155166

(51) Int. Cl.
*G06F 3/12*       (2006.01)
*G06K 15/02*      (2006.01)
(Continued)

(52) U.S. Cl.
CPC ........ *G06K 15/4065* (2013.01); *B41F 23/007* (2013.01); *G06F 3/1203* (2013.01);
(Continued)

(58) Field of Classification Search
None
See application file for complete search history.

(56) References Cited

U.S. PATENT DOCUMENTS

| 8,555,281 B1 | 10/2013 | van Dijk et al. |
| 2001/0043815 A1* | 11/2001 | Kitajima ............ G03G 15/5033 399/44 |

(Continued)

FOREIGN PATENT DOCUMENTS

| JP | 2002-373013 A | 12/2002 | |
| JP | 2013156413 | * 8/2013 | ............. G03G 21/20 |
| JP | 2013252944 | * 12/2013 | ............... B65H 3/46 |

OTHER PUBLICATIONS

European Search Report, dated Jun. 27, 2017, for European Application No. 17154306.

(Continued)

*Primary Examiner* — Beniyam Menberu
(74) *Attorney, Agent, or Firm* — Birch, Stewart, Kolasch & Birch, LLP

(57) ABSTRACT

A media processing system is arranged to process image receiving media under predetermined physical conditions. The system includes a scheduler arranged to schedule jobs to be processed in the system and to calculate predicted timings (T0) at which media will have to be ready for processing and to indicate the predicted timings on a user interface. The system further includes a buffer in which a supply of media that has been received from a first environment is kept in a specified second environment before being processed. The scheduler is configured to calculate an acclimatization time required for the media to acquire the predetermined physical conditions by being kept in the second environment in the buffer, and to calculate and indicate a predicted timing (T1) at which the media should be present in the sheet buffer at the latest in view of the calculated acclimatization time.

11 Claims, 2 Drawing Sheets

(51) Int. Cl.
*G06Q 10/06* (2012.01)
*G06Q 10/08* (2012.01)
*G06K 15/00* (2006.01)
*G06F 9/48* (2006.01)
*B41F 23/00* (2006.01)

(52) U.S. Cl.
CPC ............ G06F 3/1205 (2013.01); G06F 3/126 (2013.01); G06F 3/1217 (2013.01); G06F 3/1229 (2013.01); G06F 3/1263 (2013.01); G06F 3/1282 (2013.01); G06F 3/1296 (2013.01); G06F 9/4887 (2013.01); G06K 15/021 (2013.01); G06K 15/1823 (2013.01); G06Q 10/06315 (2013.01); G06Q 10/08 (2013.01)

(56) References Cited

U.S. PATENT DOCUMENTS

| | | | | |
|---|---|---|---|---|
| 2008/0002999 A1* | 1/2008 | Taki | ............... | G03G 15/6502 399/44 |
| 2009/0055014 A1* | 2/2009 | Lehrieder | ............ | G06Q 10/103 700/123 |
| 2010/0316398 A1* | 12/2010 | Boyatt, III | ........... | G03G 15/657 399/44 |
| 2011/0149302 A1* | 6/2011 | Stevens | ............... | G06K 7/0004 358/1.1 |
| 2011/0292443 A1 | 12/2011 | Kamata | | |

OTHER PUBLICATIONS

Sappi, "Paper Conditioning & Characteristics", SaPPiHeLP, Jul. 30, 2012, XP055295444, 3 pages.

* cited by examiner

MEDIA PROCESSING SYSTEM WITH SCHEDULER

CROSS-REFERENCE TO RELATED APPLICATIONS

This application claims priority under 35 U.S.C. § 119(a) to application Ser. No. 16/155,166.8, filed in Europe on Feb. 11, 2016, the entire contents of which is hereby incorporated by reference into the present application.

BACKGROUND OF THE INVENTION

1. Field of the Invention

The invention relates to a media processing system arranged to process image receiving media under predetermined physical conditions, the system comprising: a scheduler arranged to schedule jobs to be processed by the system and to calculate predicted timings at which media will have to be ready for processing and to indicate the predicted timings on a user interface; and a buffer in which a supply of media that has been received from a first environment is kept in a specified second environment before being processed.

The invention also relates to a method of scheduling jobs in such a system.

2. Description of Background Art

A typical example of a media processing system with which the invention is concerned is an image reproduction system where images are printed on media sheets. The system typically comprises a number of input bins, each of which stores a supply of pre-cut media sheets of a given type. When a print job is received, the job specifications are analyzed in order to determine, among other things, the type of media sheets that will be used for the job, and it is checked whether sheets of this type are present in one of the input bins. If that is not the case, a message is displayed on a screen of a local or remote user interface in order to prompt an operator or user to load the required media sheets into one of the input bins.

In other systems, the media may be supplied in the form of endless webs that are withdrawn from rolls. In that case, the operator or user will be prompted to load a new roll when necessary.

In order to avoid interruptions in the production process, it is convenient that a plurality of print jobs is scheduled in advance. The scheduler is capable of calculating or at least estimating the processing times that will be needed for the different jobs, based on the respective job specifications. Thus, the print jobs can be arranged in a print queue, which determines the order in which the jobs will be processed, and it is possible to predict for each job the time at which the media of the required type should be available. This information is also displayed on the user interface, so that the operator or user may provide the required media in time.

An example of an image processing system equipped with a scheduler has been described in U.S. Pat. No. 8,555,281 B1.

SUMMARY OF THE INVENTION

It is an object of the invention to enhance the productivity of the media processing system.

In order to achieve this object, the scheduler is configured to calculate an acclimatization time required for the media to acquire said predetermined physical conditions by being kept in the second environment in the buffer, and to calculate and indicate a predicted timing at which the media should be present in the buffer at the latest in view of the calculated acclimatization time.

The physical conditions that are required for properly processing the media comprise, for example, the temperature and the humidity content of the media. For example, when the processing involves a printing operation in which an image that has been formed on a media sheet is fused on the sheet by applying heat, the initial temperature of the sheets should not be too low and the humidity content should not be too large, so that the sheet may be heated to the required fusing temperature within a short time and consequently without delaying the print process.

The invention is based on the consideration that, in a typical print shop, a stock of media will be stored at a location that is remote from the place where the printing system is installed. For example, the media may be stored in a warehouse which is not air-conditioned. Or, in a just-in-time scenario, the media may have been transported in a non-air-conditioned truck for a considerable time before the media reach the print shop. Consequently, when the media are loaded into the input bins of the printing system immediately after they have been received from the remote storage place, their physical condition, especially their temperature and humidity content, may differ considerably from the conditions that correspond to the climate in the print shop. Consequently, the acclimatization time, especially for the first sheets to be processed, may be too short, so that the physical conditions of the sheets do not meet the requirements for proper processing.

The invention solves this problem by calculating an acclimatization time that will assure that the physical conditions, especially the temperature and humidity content of the media, have adjusted to the conditions in the print shop and are therefore suitable for processing before these media are actually needed. Based on this calculated acclimatization time, the scheduler will then calculate a latest possible timing at which the media should have reached a buffer with suitable climate conditions. In this way, it can be guaranteed that, at the time when the processing of the media begins, the physical conditions of the media will comply with the requirements.

More specific optional features and further developments of the invention are indicated in the dependent claims.

The buffer in which the climate is such that the physical conditions of the sheets will adjust to the conditions suitable for processing may be constituted by the input bin or input bins of the processing system, provided that the storage capacity of the bins is large enough to permit a sufficient acclimatization time. In that case, the timing information that is provided to the user or operator indicates the timing at which the sheets should be loaded into the input bins. The same applies equivalently to a case where the media are withdrawn from rolls which will constitute the buffer.

In a preferred embodiment, however, the buffer is distinct from the input bins of the processing system and has a larger storage capacity, so that it is possible to cope with considerably longer acclimatization times. All that is required of the buffer is that it provides an environment (climate) which permits the media to reach the physical conditions that are required for processing. Conveniently, the buffer may be a storage facility that is installed inside the print shop, preferably in proximity of the input bins of the processing system. In this case, the timings prompting the operator or user to place the media in the buffer will be different from the timings at which the sheets shall actually be loaded into the input bins of the processing system.

The acclimatization times to be calculated by the scheduler will typically depend on the properties of the media, i.e. on the respective media types. The media properties determine the acclimatization time in two different ways. On the one hand, they determine the physical conditions which the sheets should have when the processing begins. On the other hand, they also determine the speed with which the physical conditions of the sheets change during the dwell time in the sheet buffer.

It will be understood that the acclimatization times may also depend upon the physical conditions in the buffer and also on the environment to which the media have been exposed before they have reached the buffer. For example, when the physical conditions in the warehouse were characterized by a low temperature and a high humidity, the dwell time may be larger than in the case where the climate in the warehouse was warmer and dryer. Consequently, the calculated acclimatization times may also depend upon the time of the year and/or the geographical area (climate) in which the processing system is installed. On the other hand, even when the media have been kept at a low temperature, the acclimatization time may be reduced when the buffer is not just kept at room temperature but is heated to a slightly elevated temperature. Similarly, the acclimatization times may be shorter when air dryers or the like are available for reducing the humidity content of the air in the buffer.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
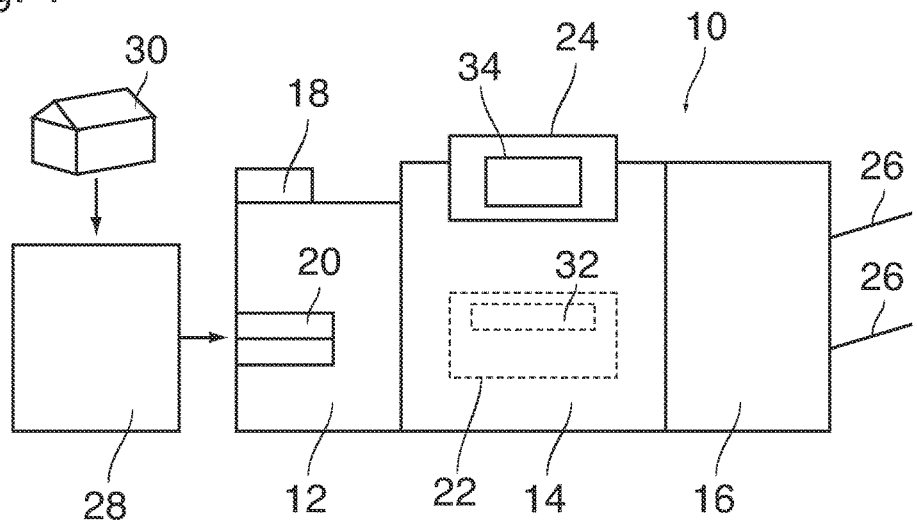
FIG. 1 is a diagram of a printing system to which the invention is applicable.

The present invention will now be described with reference to the accompanying drawings, wherein the same reference numerals have been used to identify the same or similar elements throughout the several views.

As an example of a sheet processing system, FIG. 1 shows a printing system 10 comprising an input section 12, a main processing section 14 and a finisher 16. The input section 12 is connected to a network for receiving print jobs from remote locations and includes a local scanner 18 where documents to be printed may be scanned-in. The input section further includes input bins 20 for storing media sheets of different types to be used for printing. The main processing section 14 includes a print engine for printing images on the media sheets supplied from the storage bins 20. The main processing section 14 further includes an electronic controller 22 and a local user interface 24. The finisher 16 is arranged to perform finishing operations (stapling, punching or the like) on the printed media sheets before the finished sheets are discharged on output trays 26.

While the input bins 20 are only capable of accommodating a limited supply of media sheets, a larger supply of media sheets of all types that may possibly be needed in the printing system 10 are kept ready in a local media store 28, which is provided in proximity of the printing system 10, preferably close to the input bins 20. Thus, the local media store 28 will be in the same room or at least in the same building as the printing system 10 and will consequently have a climate, which corresponds to the climate in the print shop in which the printing system 10 is installed. Since humans are working in the print shop, the climate can be expected to be characterized by a moderate temperature (e.g. room temperature) and a moderate humidity content of the air. In the simplest case, the local media store 28 may just be a place or a palette where the media sheets or packages of media sheets are stacked. In another embodiment, it is possible, however, that the local media store 28 is an air-conditioned enclosure in which a climate is maintained that is particularly suited for storing the media sheets and may be different from the climate in the rest of the print shop.

An even larger stock of media sheets of all types is stored in a warehouse 30, which may be a non-conditioned building or building part separate from the building or building part where the printing system 10 is installed.

Thus, as has been indicated by arrows in FIG. 1, media sheets are from time to time transferred from the warehouse 30 to the local media store 28, and smaller batches of media sheets will be transferred from the local media store 28 to the input bins 20 of the printing system in order to refill the input bins.

The controller 22 of the printing system 10 is arranged to receive commands from the local user interface 24 or from remote user interfaces via the network and to control all operations of the input section 12, the main processing section 14 and the finisher 16. Further, the controller 22 controls the user interface 24 for displaying messages and other information on a display of the user interface 24.

When one or more print jobs are received at the receiving section 12, a specific module in the controller 22, which is called a scheduler 32, sorts the received jobs by their priorities and arranges them in a print queue, which determines the sequence in which the jobs will be processed. Further, based on more or less detailed information on the processing operations to be performed in the main processing section 14 and the finishers 16, the scheduler calculates for each job an estimate of the time that will be needed for processing the job. Based on these estimates, the scheduler calculates a time schedule 34, which will be displayed on the user interface 24 (and possibly also on remote user interfaces).

Figure 2:
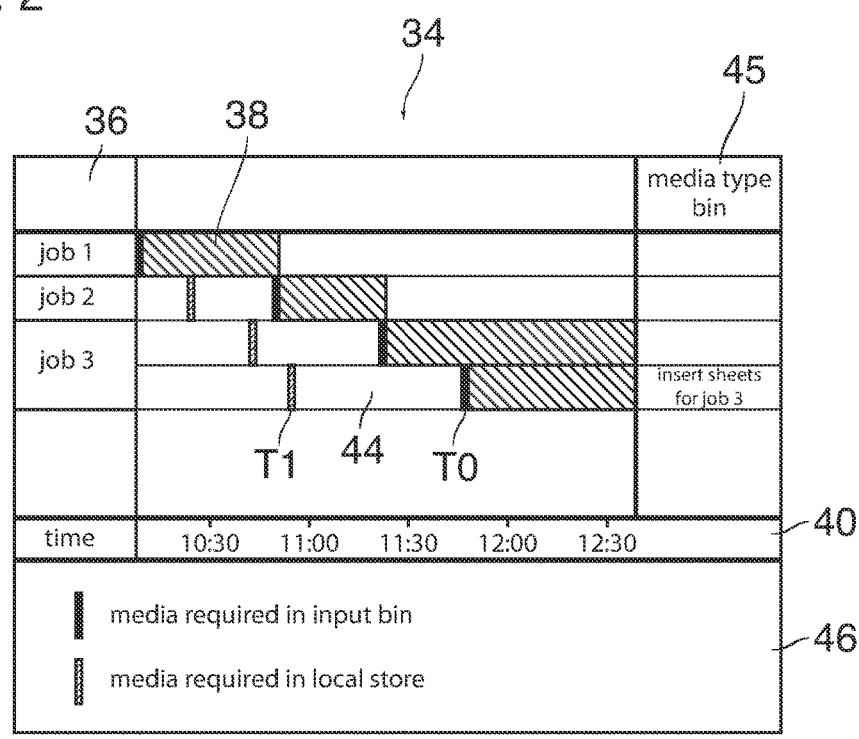
FIG. 2 is an example of a job schedule as displayed on a user interface of the printing system.

FIG. 2 shows an example of such a time schedule for the simple case that only three print jobs "job 1", "job 2", "job 3" are waiting in the print queue. A column 36 on the left margin of the display screen identifies the print jobs, and a time bar 38 is displayed for each job. The time bars 38 symbolize the expected durations of the respective print jobs and indicate the start and end times of the jobs. These times can be read on a time scale 40 that is displayed below the time bars.

Further, the scheduler calculates the expected timings of certain events, which require an activity from the user or the operator of the printing system, such as refilling an input bin 20, removing sheets from an output tray 26, and the like.

The estimates for the duration of the job processing as symbolized by the time bars 38 may be based on a more or less detailed model of the processing operations that are to be performed in the processing system and the times needed for each of these operations.

Timings T0 at which new media sheets are to be loaded into the input bins 20 are indicated by solid black bars in FIG. 2. The time at which the sheets for a given job must be loaded into the input bin is given by the position of the solid black line relative to the time scale 40. A column 45 at the right margin of the display screen indicates for each job the type of the media sheets that are needed for the job as well as the input bin 20 into which these sheets are to be loaded.

As illustrated in FIG. 2, the timings T0 coincide essentially with the beginning of the processing of the respective job, although certain reserve times may be provided between the timing T0 and the actual start of processing of the job. This means that the dwell times of the media sheets in the input bin 20 may be extremely short, especially for the first few sheets to be processed. Consequently, when the sheets had not been stored for a certain time in the local media store 28, but had been fetched directly from the warehouse 30, there is a certain likelihood that the temperature of the sheets would be too low and/or the humidity too high for proper processing in the print engine.

In order to avoid this risk, the scheduler 32 is configured to calculate for each job, depending on the media specifications and reasonable (worst case) assumptions for the climate in the warehouse 30, a minimum acclimatization time 44 for which the sheets should be kept in the local media store 28 in order for the temperature and humidity of the sheets to adjust to the climate in the store 28 and, consequently, to values suitable for processing the sheets. Timings T1, which represent the latest possible time at which the sheets should be transferred from the warehouse 30 into the local store 28 in order to assure a sufficient acclimatization time are indicated by hatched vertical bars in FIG. 2. A legend 46 displayed on the bottom part of the screen of the user interface helps to explain the meaning of the timings T0 and T1. Thus, the user or operator is prompted to transfer the required media sheets from the warehouse 30 to the local store 28 no later than the timings T1 as read on the time scale 40. The user or operator may be prompted by a dedicated message to be displayed on the screen of the user interface.

As has been shown for "job 3" in FIG. 2, a job may involve processing of more than one type of media, e.g. because insert sheets are to be inserted in-between the regular sheets. In that case, separate time bars 38 are shown for each media type, and each time bar represents the time span in which the respective media type will be processed. Of course, the timings T1 may be different for the different media types.

Conversely, one and the same media type may be needed for different jobs. Then, a timing T1 will be indicated only for the job that is the first to require media sheets of this type.

Figure 3:
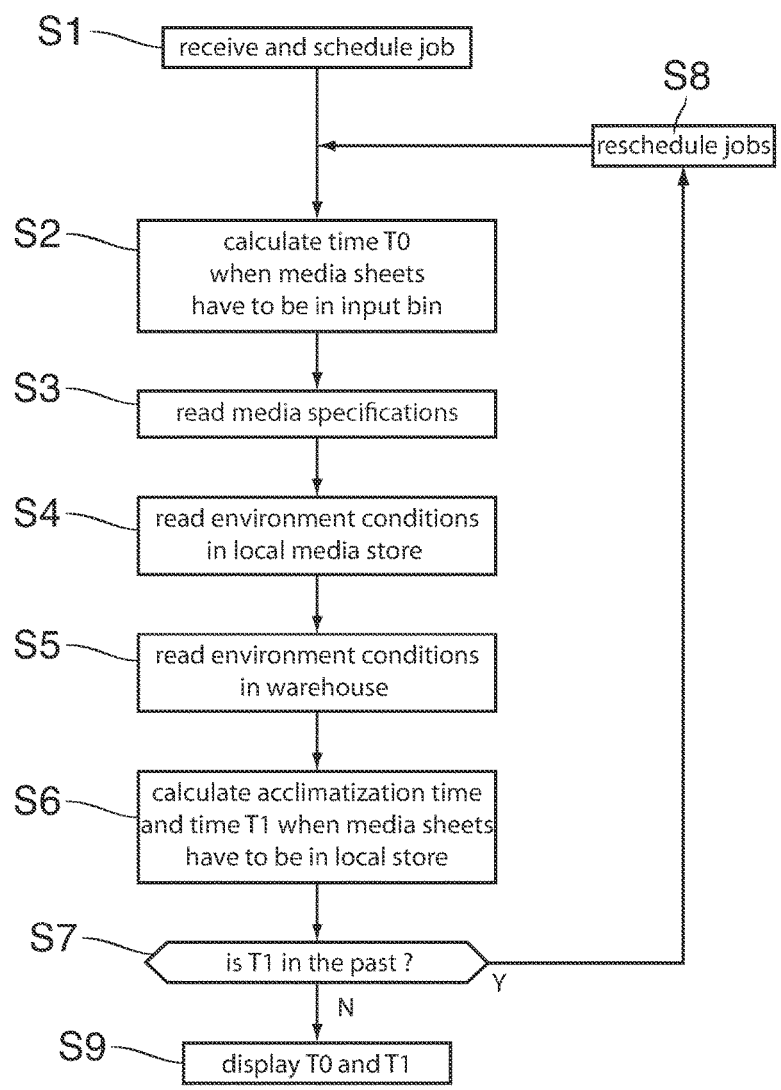
FIG. 3 is a flow diagram illustrating a method according to the invention.

The essential steps of a representative example of a scheduling method according to the invention have been shown in a flow diagram in FIG. 3.

A new job is received, added to the print queue and scheduled in step S1. The time T0 at which the media sheets for this job should be available in the input bin 20 is calculated in step S2. The media specifications describing the physical properties of the media sheets and the environment conditions in the local media store are read in steps S3 and S4, respectively. The environment conditions in the local media store may, for example, be measured by means of a thermometer, an air humidity meter, and the like. If no suitable equipment for measuring these values is available, the data may just be based on reasonable assumptions.

The environment conditions in the warehouse 30 are read in step S5. Again, rather than actually measuring the climate in the warehouse, it is possible to estimate the climate based on reasonable assumptions, taking the physical properties of the building, the time of the year, and the like into consideration.

The data gathered in steps S3 to S5 permit to calculate the acclimatization time in step S6. Further, subtracting the acclimatization time from the time T0 calculated in step S2 yields the time T1 when the media sheets should be present in the local store.

In step S7, it is checked whether the time T1 calculated in step S6 is in the past. If this is the case (Y), this would mean that the sheets cannot be processed properly and the print process would have to be interrupted. In order to avoid this, the workflow branches to a step S8 where the print jobs are rescheduled. For example, if other jobs are waiting in the print queue, and media sheets for these jobs are already present in the local store 28, then the job for which the timing T1 has been calculated in step S7 may be shifted to a later position in the print queue. This will result in a later time T1 which is in the future, so that the print processing can be continued without interruption.

When it is found in step S7 that the time T1 is in the future, the timings T0 and T1 are displayed on the user interface in step S9.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A media processing system arranged to process image receiving media under predetermined physical conditions, the system comprising:
    a controller including a scheduler module configured to schedule jobs to be processed from input bins in the system, to calculate first predicted timings (T0) at which media will have to be ready for processing and to indicate the first predicted timings on a user interface; and
    a buffer in which a supply of media that has been received from a first environment is kept in a specified second environment before being processed,
    wherein the buffer is distinct from the input bins and comprises a local media store from which the media are to be transferred to a media input section from which the media will be supplied for being processed,
    wherein the scheduler module is further configured to:
        calculate an acclimatization time required for the media to acquire said predetermined physical conditions by being kept in the second environment in the buffer, and to calculate and indicate a second predicted timing (T1) by prompting a user at which time the media should be present in the sheet buffer in view of the calculated acclimatization time, and schedule a plurality of print jobs waiting in a queue, and wherein the prompting is displayed adjacent to the schedule of the plurality of print jobs on a screen of the user interface.

2. The media processing system of claim 1, wherein the controller is further configured to execute the plurality of print jobs.

3. A method of scheduling jobs to be processed in a media processing system, said method comprising the steps of:

calculating a first timing (T0) at which image receiving media will have to be ready for processing from input bins of the media processing system;

indicating the first timing (T0) on a user interface;

calculating an acclimatization time required for the media to acquire a predetermined physical condition by being kept in a known environment in a buffer, the buffer being distinct from the input bins;

calculating and prompting a user a second timing (T1) at which time the media should be present in the buffer on the basis of the calculated acclimatization time; and determining a schedule for a plurality of print jobs waiting in a queue, wherein the prompting is displayed adjacent to the schedule of the plurality of print jobs on a screen of the user interface.

4. The method according to claim 3, wherein the step of calculating the acclimatization time includes a step of reading media specifications that describe physical properties of the media.

5. The method according to claim 3, wherein the step of calculating the acclimatization time comprises a step of reading data that specify a climate in the buffer.

6. The method according to claim 3, wherein the step of calculating the acclimatization time comprises a step of reading data that specify a climate in an environment where the media are kept before they are transferred into the buffer.

7. The method according to claim 3, wherein said physical conditions comprise at least a temperature of the media.

8. The method according to claim 3, wherein said physical conditions comprise at least a humidity content of the media.

9. The method according to claim 3, wherein, when the second calculated timing (T1) at which the media should be present in the buffer is in the past at the time of calculation, re-scheduling the jobs by giving priority to another job for which the media are already available in the buffer.

10. A software product comprising program code on a non-transitory computer-readable medium, the program code causing the computer to perform the method according to claim 3.

11. The method according to claim 3, further comprising executing the plurality of print jobs.

* * * * *